July 24, 1956 E. E. TEUBNER 2,756,316
APPARATUS FOR ELECTRICALLY ERODING MATERIALS
Filed Dec. 22, 1950 2 Sheets-Sheet 1
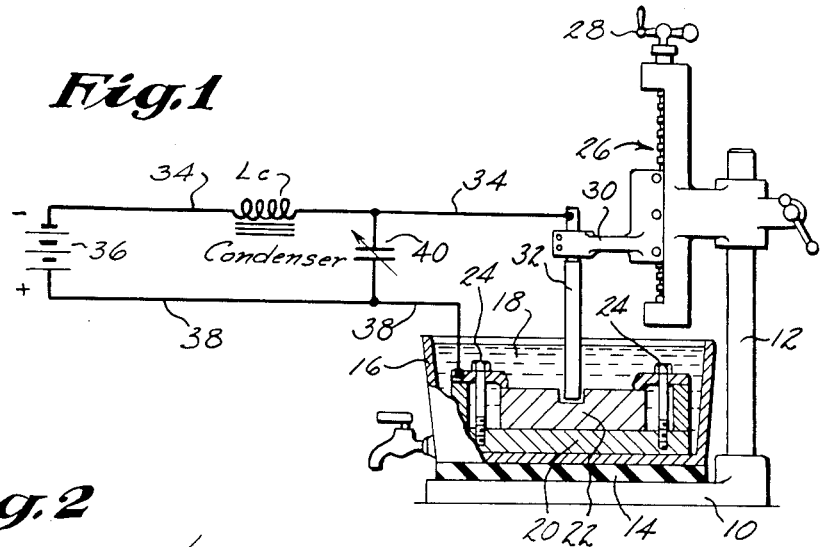
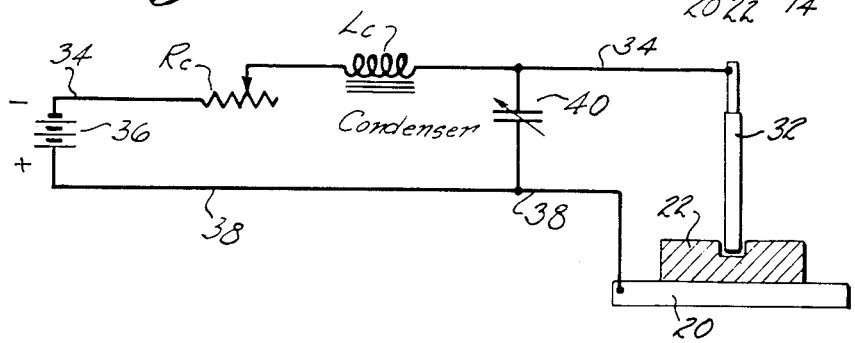
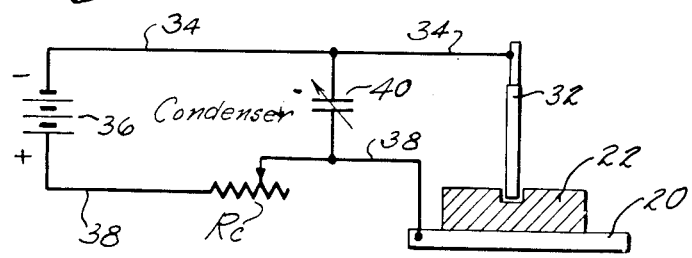
INVENTOR.
EDMUND E. TEUBNER
BY
Louis Necho
Attorney July 24, 1956  E. E. TEUBNER  2,756,316
APPARATUS FOR ELECTRICALLY ERODING MATERIALS
Filed Dec. 22, 1950  2 Sheets-Sheet 2
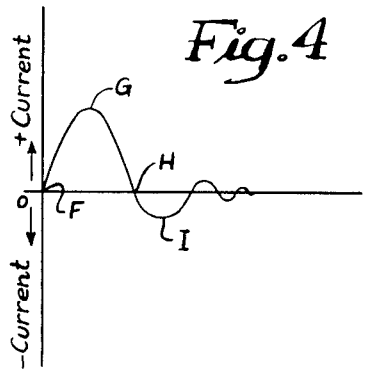
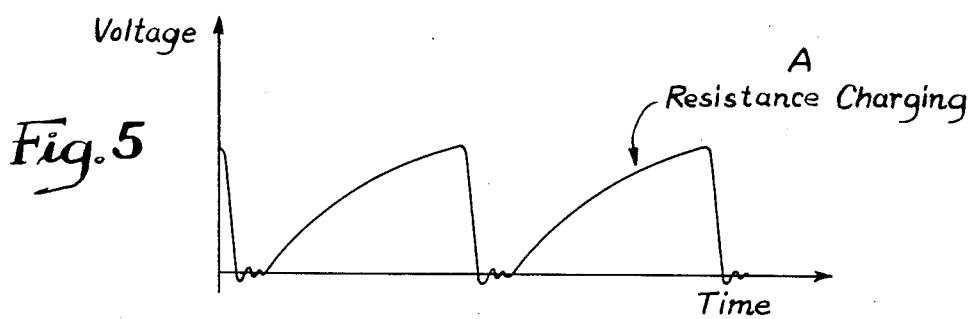
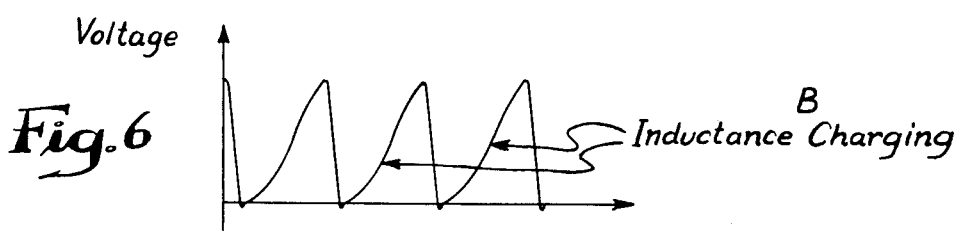
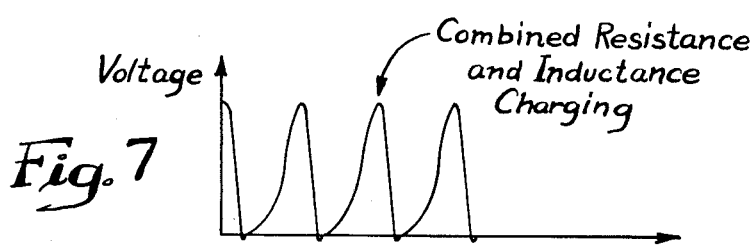
Inventor
EDMUND E. TEUBNER

United States Patent Office 2,756,316
Patented July 24, 1956

2,756,316

APPARATUS FOR ELECTRICALLY ERODING MATERIALS

Edmund E. Teubner, Upper Darby, Pa., assignor to The Method X Company, Lansdale, Pa., a corporation of Pennsylvania Application December 22, 1950, Serial No. 202,361

4 Claims. (Cl. 219—15)

This invention relates to the art of machining extremely hard metals, sintered carbides, and other very hard alloys, which cannot be practicably or advantageously machined by conventional mechanical methods, by the action of successive, condenser spark discharges between an electrode and the workpiece to be machined.

One object of the invention is to produce improved means for, and an improved method of electrically machining the extremely hard materials referred to above by the process above generally alluded to.

In United States Patent No. 2,650,979, issued September 1, 1953, on the application of E. E. Teubner and entitled Method and Apparatus for Electrically Disintegrating Metallic Material, there is shown one form of apparatus for machining extremely hard materials, which apparatus has been in successful operation on a commercial scale for quite some time. While the apparatus referred to and its method of operation are simple and practical and are commercially usable, it is nevertheless a further, and more specific object of the present invention to improve upon the apparatus and method disclosed in the Teubner patent aforesaid.

In the patent referred to, the workpiece and the adjacent end of the electrode are immersed in a dielectric liquid, such as kerosene or transformer oil and, other factors aside, a spark discharge may be said to take place when the voltage across the condenser is high enough to break down the liquid intervening between the electrode and the workpiece and to produce an ionized path for the spark discharge. Following the discharge, the condenser voltage, and corresponding voltage across the gap between electrode and workpiece, drops to so low a value that ionization of the gap is not maintained and the gap is deionized, that is, ceases to form a conducting path. The condenser then recharges and the electrode is advanced, until the condenser voltage rises to a point at which a spark discharge again takes place. Successive spark discharges are produced by successive recharging of the condenser and corresponding deionization of the dielectric liquid between the electrode and the workpiece.

A spark discharge of the type referred to is, with the circuit arrangements prevailing in these machines, oscillatory in character and appears as shown in Figure 3, from which it will be seen that an extremely high current of an extremely short duration is produced. The overall duration of the current probably does not exceed 150 microseconds. The density of the current in the discharge gap decreases very rapidly from the peak current produced at initial discharge. The rate at which the current density decreases varies for different metals. For example, under certain conditions, with a current of 200 amperes, and measured in terms of amperes per square centimeter, the current densities for magnesium will be greater than 1,000,000 after 1 microsecond; 1,000,000 after 5 microseconds and 320,000 at 20 microseconds, while the corresponding current densities for tungsten will be 160,000 after 1 microsecond; 340,000 after 5 microseconds and 75,000 after 20 microseconds.

It has also been ascertained that the useful work, i. e. erosion of the workpiece, is effected only when the current density is high and thus by the currents in the first half-cycle, and that, generally speaking, and other things being equal, the useful work done on the workpiece may be said to be a function of the rate at which spark discharges may be produced. The rate at which sparks may be produced between the electrode and the workpiece, again speaking generally and other things being equal, may be described as a function of the charging time of the condenser and of the deionization time of the dielectric liquid between the electrode and the workpiece.

It is therefore a still further object of the invention to produce improved means whereby the rate at which sparks may be produced in an apparatus of the type disclosed in the Teubner patent aforesaid may be greatly increased.

A still further object is to produce improved condenser-charging circuits whereby the charging of the condenser is made more uniform and whereby the condenser charging time is reduced thus correspondingly decreasing the time interval between successive sparks.

These, and other objects are attained by my invention as set forth in the following specification and as shown in the accompanying drawings in which:

Fig. 1 is a diagrammatic view, partly in elevation and partly in section showing the application of one embodiment of the present invention to an apparatus of the type shown in the Teubner patent aforesaid.

Fig. 2 is similar to Fig. 1 showing the application to the said apparatus of another embodiment of the present invention.

Fig. 3 represents the circuit of a spark machining apparatus of the type disclosed in the aforesaid Teubner patent;

Fig. 4 is a curve illustrating the shape and polarity of the spark discharge current in apparatus of the type shown in Fig. 3;

Fig. 5 is a curve showing the voltage appearing across the capacitor of an apparatus of the type indicated in Fig. 3;

Fig. 6 is a curve showing the capacitor voltage in the circuit of Fig. 1; and

Fig. 7 is a curve showing the capacitor voltage in the apparatus of Fig. 2.

Referring more particularly to Figure 1 which represents one embodiment of the present invention, the apparatus includes a pedestal 10 for supporting the workpiece and an upright 12 for supporting a suitable feed mechanism for constantly advancing the electrode toward the workpiece. The pedestal 10 supports an electrically insulating block 14 on which is mounted a container 16 for the dielectric liquid 18. In the container 16 is a mounting block 20 to which the workpiece 22 is clamped by bolts or the like 24. The upright 12 carries a feed mechanism which is only diagrammatically shown and which is generally designated by numeral 26. As shown, the feed mechanism is manually operated by turning hand wheel 28 to raise or lower arm 30 which holds electrode 32. In actual practice, the feed mechanism may be operated electrically and may be substantially automatic. The electrode 32 is connected by wire 34 to the negative side of a source of direct current 36 and the workpiece 22 is connected by wire 38 to the positive side of the source 36. An electrical energy storage means in the form of a condenser 40 is connected across the wires 34 and 38, thus forming a charging circuit connecting the source 36 with the condenser and a discharging circuit connecting the condenser with the electrode and workpiece. In accordance with the invention, as shown in Fig. 1, an inductance Lc is provided in the charging circuit.

The charging circuit of the apparatus shown in the Teubner patent aforesaid is shown in Figure 3. The workpiece 22 is connected through its support 20 by wire 38 to the positive side of a source 36 of direct current. A resistance Rc is interposed in the wire 38 between the source 36 and the workpiece 22. The electrode 32 is connected by a wire 34 to the negative side of the source 36. A condenser 40 is connected across the wires 34 and 38.

Fig. 4 illustrates the discharge current in the prior art circuit of Fig. 3 and affords a measure of the spark current itself. In this figure the portion of the curve FGH corresponds to the principal useful current flow occurring during the initial positive half cycle. This, in accordance with the polarity conventions of the circuit drawings, represents positive current flow. The direction of current flow reverses during the first negative or oscillatory half cycle HIK. The oscillation is rapidly attenuated and the small amplitude current or reverse current are not desired or useful in spark machining. The tendency of the discharge current to oscillate indicates the problem that exists of deionizing a spark gap after the initial spark impulse and preventing source current from flowing directly into the spark gap.

Fig. 5, as the voltage-time plot of the condenser in a circuit such as that shown in Fig. 3 illustrates the known function of the resistor Rc. The curve is the characteristic resistance-capacitance exponential curve. It will be seen from this figure that the rate voltage charge is initially high and decreases exponentially until either the condenser is charged or sparkover occurs. Upon sparkover the condenser energy is discharged into the discharge circuit through the spark gap. The duration of the discharge is a function of the discharge circuit impedance, which is held to a minimum value in order that the discharge current may be of high amplitude and short duration.

From this it is indicated that, other things being equal, a constant rapid rise in voltage during condenser charging would increase the sparking rate and the overall efficiency of the apparatus.

To this end, I have devised the charging circuit illustrated in Figure 1 from which it will be seen that resistance Rc forming part of the charging circuit in the apparatus of the Teubner patent aforesaid has been replaced by an inductance Lc. Oscilloscopic observation showed the voltage rise across the condenser to have the form of curve B shown in Fig. 6 from which it will be seen that the charging time, when inductance is used, can safely be made much less than when resistance is used and that the effect of the inductance is to produce an essentially linear rise of voltage across the capacitor during the charging cycle.

Typical useful values of inductance range from 0.05 to 0.5 henry. No particular advantage results from use of larger values than these but larger values work as well. A comparison of resistance charging (Figure 3) with inductance charging (Figure 1) of the condenser follows:

|  | Percent of source voltage | | |
| --- | --- | --- | --- |
|  | 90% | 95% | 98% |
| Charging Time: | | | |
| with resistance | 2.3 $R_xC$ | 2.95 $R_xC$ | 3.9 $R_xC$ |
| with inductance | .9 $R_xC$ | .95 $R_xC$ | .98 $R_xC$ |
| Percent speed increase with inductance over resistance | 250 | 310 | 400 |

NOTE.—"$R_x$" in the foregoing table is the minimum value of resistance that can be used in the resistance charging circuit consistent with stable operation. "C" means the capacitance of the condenser.

From the foregoing it will be seen that by the use of inductance charging the overall operation of the apparatus is greatly accelerated as compared with resistance charging and that, because of more constant charging of the condenser, it can effect breakdown of the spark gap more often in a given interval of time to accomplish more cutting or machining. The average condenser charging current rises correspondingly.

In Figure 2 there is shown another embodiment of the present invention in which inductance Lc and resistance Rc are used in combination in the charging circuit. When this arrangement is used, the voltage rise across the condenser has been found to be as shown in Figure 7, from which it will be seen that the voltage rises slowly at the beginning of the cycle and very rapidly during the balance of the charging cycle. The charging cycle is oscillatory and the effect of the resistance is to shift the oscillation phase to produce the desirable effect of slow initial rise. Only the first part of one oscillation appears ordinarily because of the breakdown of the gap as the voltage approaches a maximum value.

The optimum size inductance and resistance can be computed mathematically but it will be found easier and sufficiently satisfactory to determine such optimum values experimentally.

Typical values of capacitance, inductance, resistance and source voltage in accordane with my invention are as follows, it being understood that these values are given for illustration only and that the invention is not limited thereto:

| | |
| --- | --- |
| Capacitance of condenser | microfarads 67 |
| Inductance | henries 0.36 |
| Resistance | ohms 10 |
| Source voltage | volts 220 |

Using these values, the sparking rate is about 250 sparks per second as compared with a sparking rate of 50 sparks per second obtained with resistance alone in the charging circuit.

Various theories have been advanced to explain the manner in which hard metals are eroded by the process employed in the apparatus above described. Thus, it has been thought that electrolytic action, or vaporization by heat, or explosive forces, or the process known as "cavitation," may be responsible for the observed phenomenon. But, theoretical calculations and physical observations seem to indicate that none of these suggested theories can afford a complete or satisfactory explanation. The only theory that applicant is aware of that seems to be reasonably satisfactory is based on a consideration of ionic force. This theory may be briefly stated as follows:

The structure of a metal consists of atoms the outer (valence) electrons of which are relatively free to leave the atom under the influence of an external electric field and move in a direction opposite to that of the field. The positively charged ions which are formed when the free electrons leave the atom will be subjected to a force in the direction of the field. These positively charged atoms, or metal ions, are held in position by very strong binding forces and, under the influence of electric fields encountered at ordinary current densities, the metal ions remain in their fixed positions. However, theoretical calculations, based on probable current densities, and the charge and mass of metal ions indicate that, at very high current densities the electric field becomes great enough within the workpiece to overcome the binding force and will cause minute particles of metal to be ruptured or detached from the surface of the metal at the point of the spark discharge. It is of course possible that the rupture of the particles due to ionic forces is facilitated by the attendant explosive forces and the surface vibrations incidental to such explosive forces. But, as above stated, it is believed, and theoretical calculations support this belief, that ionic forces alone are sufficient to account for the rupture of particles from the workpiece.

This invention is not limited to the preferred embodiment but may be otherwise embodied or practiced within the scope of the following claims.

What I claim is:

1. In apparatus for dislodging particles from an electrically conductive workpiece by applying thereto a succession of separate time spaced unidirectional electrical discharges, the combination comprising means for applying said discharges including an anodic electrode comprised of a portion of said workpiece, a cathodic tool electrode continuously spaced from said other electrode by a fluid dielectric which is electrically rupturable to establish a high degree of conductivity across said gap at a predetermined potential gradient applied thereon by said electrodes and self-restoring to a normally relatively non-conductive condition at a lesser applied potential gradient, a capacitative storage means having its positive terminal connected to said workpiece and its negative terminal connected to said cathodic tool to discharge said storage means upon rupture of the said dielectric fluid, means for including said storage means in a series charging circuit together with a source of direct current and an inductance whereby to suppress the time rate of potential rise on said storage means throughout the initial portion of each charging period thereof which follows each said discharge, and means for relatively adjusting the spacing of said electrodes as particle removal from the workpiece proceeds.

2. In apparatus for dislodging particles from a conductive workpiece by application thereupon of a succession of separate time spaced unidirectional electric space discharges, the combination comprising, a spark gap including an anodic electrode comprised of a portion of said workpiece, a cathodic tool electrode continuously spaced from said first electrode by a fluid dielectric which is electrically rupturable within the space defined by said electrodes upon application thereupon of a predetermined potential gradient and is self-restoring to a normally unruptured condition at some lesser potential gradient, capacitative storage means for storing a predetermined quantity of electrical energy, a charging circuit including said storage means in series with a source of current for charging said last means together with an inductance whereby to limit the rate of charging said storage means throughout the initial portion of the charging thereof, a discharging circuit excluding said inductance and comprised of said storage means and said spark gap connected in series and rendered effective to discharge said storage means upon rupture of said dielectric, and means for readjusting the said space between said electrodes as particle removal therefrom proceeds whereby to maintain said gap of substantially constant length.

3. In apparatus for dislodging particles from a conductive workpiece by application thereupon of a succession of separate time spaced unidirectional electric space discharges, the combination of a cathodic tool electrode continuously spaced from the workpiece and defining therewith a spark gap, means for inundating the spark gap with a fluid dielectric which is electrically rupturable within the gap upon application thereupon of a predetermined potential gradient and is self-restoring to a normally unruptured condition at some lesser potential gradient, capacitative storage means for storing a predetermined quantity of electrical energy, a charging circuit continuously including said storage means in series with a source of current for charging said storage means, said charging circuit also including in series a resistance and an inductance whereby to limit the rate of charging said storage means throughout the initial portion of the charging thereof, a discharging circuit comprised of said storage means and the spark gap connected in series but excluding said resistance and said inductance, said discharging circuit being effective to discharge said storage means upon rupture of said dielectric, and means for readjusting the said space between said electrodes as particle removal therefrom proceeds whereby to maintain the spark gap of substantially constant length.

4. An apparatus for dislodging particles from a conductive workpiece by the application thereto of a succession of separate time spaced unidirectional electric space discharges, said apparatus comprising in combination, a spark gap including an anodic electrode comprised of a portion of said workpiece, a cathodic tool electrode continuously spaced from said first electrode by fluid dielectric which is electrically rupturable within the space defined by said electrodes upon application thereupon of a predetermined potential gradient and is self-restoring to a normally unruptured condition at some lesser potential gradient, capacitative means for storing electrical energy and releasing the same in pulses of predetermined magnitude and relatively short duration, a charging inductance connected in series with said capacitative means whereby to limit the rate of charging said means throughout the initial portion of the charging thereof, and a discharge circuit including said spark gap and said capacitative means, and means for readjusting the space between said electrodes as particle dislodgment therefrom proceeds.

References Cited in the file of this patent

UNITED STATES PATENTS

| | | |
|---|---|---|
| 2,287,543 | Vang | June 23, 1942 |
| 2,308,860 | Clark | Jan. 19, 1943 |
| 2,385,665 | Warwick | Sept. 25, 1945 |
| 2,458,871 | Oles | Jan. 11, 1949 |
| 2,473,917 | Steinert et al. | Jan. 21, 1949 |
| 2,473,928 | White | June 21, 1949 |
| 2,526,423 | Rudorff | Oct. 17, 1950 |

FOREIGN PATENTS

| | | |
|---|---|---|
| 257,468 | Switzerland | Oct. 15, 1948 |
| 637,872 | Great Britain | May 31, 1950 |